United States Patent
Holmström et al.

(10) Patent No.: US 11,652,615 B1
(45) Date of Patent: May 16, 2023

(54) SYSTEM FOR DISPERSING ACCESS RIGHTS FOR ROUTING DEVICES IN NETWORK

(71) Applicants: John Holmström, Helsinki (FI); Kenneth Ramstedt, Helsinki (FI)

(72) Inventors: John Holmström, Helsinki (FI); Kenneth Ramstedt, Helsinki (FI)

(*) Notice: Subject to any disclaimer, the term of this patent is extended or adjusted under 35 U.S.C. 154(b) by 0 days.

(21) Appl. No.: 17/934,736

(22) Filed: Sep. 23, 2022

(30) Foreign Application Priority Data

Feb. 8, 2022 (FI) .................................... 20225107

(51) Int. Cl.
*H04L 9/08* (2006.01)
*H04L 9/32* (2006.01)

(52) U.S. Cl.
CPC .......... *H04L 9/0825* (2013.01); *H04L 9/3226* (2013.01); *H04L 9/3242* (2013.01); *H04L 9/3271* (2013.01)

(58) Field of Classification Search
CPC ... H04L 9/0825; H04L 9/3226; H04L 9/3242; H04L 9/3271
USPC ........................................................ 713/171
See application file for complete search history.

(56) References Cited

U.S. PATENT DOCUMENTS

| | | | | |
|---|---|---|---|---|
| 5,926,756 A * | 7/1999 | Piosenka | ............... | H04W 8/245 455/418 |
| 8,719,568 B1 * | 5/2014 | Antypas, III | ....... | H04L 63/0884 713/168 |
| 2006/0114839 A1 | 6/2006 | Meier et al. | | |
| 2008/0077592 A1 | 3/2008 | Brodie et al. | | |
| 2012/0254622 A1 * | 10/2012 | Kanungo | ................. | G06F 21/34 713/183 |
| 2014/0164781 A1 * | 6/2014 | Joshi | ..................... | H04L 9/3271 713/184 |
| 2014/0281575 A1 | 9/2014 | Springfield et al. | | |
| 2015/0143119 A1 * | 5/2015 | Matsunaga | ........ | H04N 21/4363 713/168 |
| 2020/0344055 A1 * | 10/2020 | Topps | ................... | H04L 9/0822 |
| 2021/0014044 A1 * | 1/2021 | Bursell | ................... | H04L 9/083 |
| 2022/0209944 A1 * | 6/2022 | Nix | ........................ | H04L 9/3263 |

OTHER PUBLICATIONS

Cisco Systems, Inc. Aladdin eToken and Cisco ISR Solution. [online], Jun. 15, 2008, [retrieved on May 12, 2022]. Retrieved from <https://community.cisco.com/kxiwq67737.attachments/kxiwq67737/6016-dilscussions-lan-switching-routing/459754/1/eToken_Cisco_ISR_DS.pdf>.
Zhu, L. et al. RFC 4556. Public Key Cryptography for Initial Authenticatyion in Kerberos (PKINIT). IETIF, [online], Jun. 2006, [retrieved on May 5, 2022]. Retrieved from <https://www.rfc-editor.org/rfc/pdfrfc/rfc4556.txt.pdf>.

* cited by examiner

*Primary Examiner* — Amie C. Lin
*Assistant Examiner* — Moeen Khan
(74) *Attorney, Agent, or Firm* — Renner Kenner Greive Bobak Taylor & Weber

(57) ABSTRACT

A system for dispersing access rights for routing devices in a network including a router, a key and a key socket, and a key-router validation server. The router and the physical key must be present and both must be validated by the key-router validation server before the router can establish a VPN network between remote external and internal networks. Neither the key nor the router does contain critical information for allowing access to networks. Losing either the key, or the router, does not endanger security of the networks. This is the essence of dispersed access rights.

7 Claims, 5 Drawing Sheets

SYSTEM FOR DISPERSING ACCESS RIGHTS FOR ROUTING DEVICES IN NETWORK

FIELD OF THE INVENTION

The invention relates to network security systems and especially to a system for dispersing access rights for routing devices in a network.

BACKGROUND

The need for secure, reliable and resilient communication is constantly growing. Methods, such as VPN (Virtual Private Networks) and IPsec for example, address the issue of trustworthiness in communication, however, using these methods might introduce other risks into a secure network solution. Management of credentials and authorization information is critical as this information equals access to a secure network. Losing these, may compromise a complete secure network.

In cases where the "remote end" of a communication system needs to provide, for example, support for a remote network segment to securely communicate with a local network, VPN-routers are typically used.

VPN routers, for example, may contain credentials, capabilities, authorization privileges and other critical details for establishing secure and encrypted communication links between the remote and local networks and as such, the remote end VPN-router may present a security risk to the overall secure network by itself, if compromised.

Risks may be realized, for example, through theft of a physical VPN router. If a VPN-router contains, for example (PKI) certificates consisting of public and private parts, it may present risks if, for example, authentication details and the private part of a certificate is compromised. The risk is comparable with losing physical keys to a secure facility.

US2014281575A1 discloses a pre-boot authentication using a cryptographic processor. The pre-boot authentication is performed with an apparatus having a cryptographic processor.

US2008077592A1 discloses a method and an apparatus for a device authentication. That includes provisioning of a client device and storing created parameters on a database for a later authentication.

In order to mitigate risks of losing critical information needed for establishing communication links from remote networks to local internal networks (and vice versa), a system for dispersing access rights for routing devices in a network is disclosed.

BRIEF DESCRIPTION OF THE INVENTION

The object of the invention is a communication system which alleviates the drawbacks of the prior art. A system of the present disclosure introduces a concept of dispersing critical information between multiple devices and systems in such a way, that compromising a single device, will not present a vulnerability to a network.

BRIEF DESCRIPTION OF THE FIGURES

The invention is now described in more detail in connection with preferred embodiments, with reference to the accompanying drawings, in which.

DETAILED DESCRIPTION OF THE INVENTION

Figure 6:
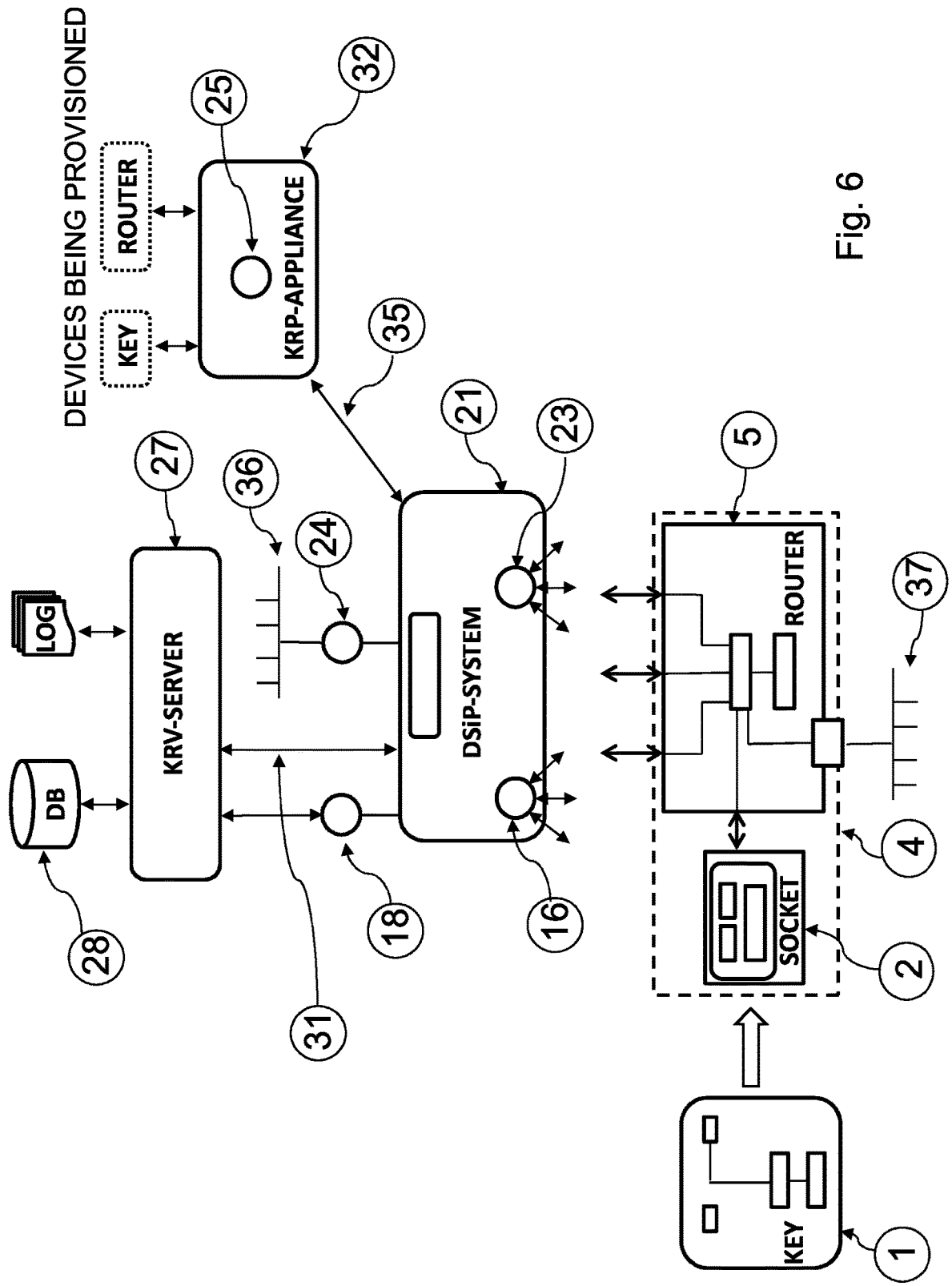
FIG. 6 illustrates overall system layout of an embodiment of a system.

Referring to the FIG. 6, one of the objectives of an embodiment of the present disclosure is, to create a VPN connection between an external network (37) and an internal network (36) using a router (4) and an associated physical key (1). Neither the key nor the router contains any authentication details and credentials that could compromise the system, and said networks (36; 37), if either one is lost. Access to the internal/external networks is created only if the key (1), router (4) and the key-router validation server, KRV-server (27) are all simultaneously present.

Shortly; a communications router (4) and a physical key (1) must be present and both must be validated by the key-router validation server (27) before the router can establish a VPN network between remote external (37) and internal networks (36). Neither the key nor the router does contain critical information for allowing access to networks—thus, losing either the key, or the router, is not "dangerous" from a network security point of view. This is referred to as "dispersed access rights". Losing both the key and the router, may present a risk.

Removing critical information from the communications router mitigates handling of the network components. Since the router does not contain any critical information, it can be left unmonitored or even handled and shipped by third parties to remote locations, for example, without risk of losing critical information. The same applies for the key— the key does not contain critical information. Communications credentials and critical information will be present only when the key and the router are used together.

The presented solution mitigates, for example, installation of VPN networks in vehicles. Since there is no critical information stored in the vehicle VPN router, theft of a vehicle does not present the network itself with vulnerabilities. As information to the reader, all connections described in the present disclosure, are authenticated, encrypted and peer-verified using existing technology such as, for example, but not limited to, PKI (public key infrastructure) and TLS (transport layer security) methods based on PSK (pre-shared key) and certificates.

Referring again to FIG. 6, an embodiment of the overall system of the present disclosure comprises the following components having functional interactions with each other:

Key (1). The key is a small size physical unit containing a battery or capability for receiving energy transmitted from a key socket (2). The key (1) communicates with the rest of the system via its key socket typically using light e.g., but not limited to, an infrared IrDA transceiver. Energy is transported to the key, for example but not limited to, using Qi-methods. The key contains a secure cryptoprocessor (12) such as, for example but not limited to, a Trusted Platform Module (TPM). Overall handling of various mechanisms, such as communication are handled by a processor.

The key socket (2) is designed for being the receptacle i.e., holder of the key (1). The socket contains devices for allowing the key and the rest of the system to communicate with each other. The socket also contains a system for transmitting energy wirelessly to the key for example, but not limited to, a QI-transmitter. The socket further contains a processor responsible for controlling various features e.g., communication and controlling functions of the socket.

Figure 1:
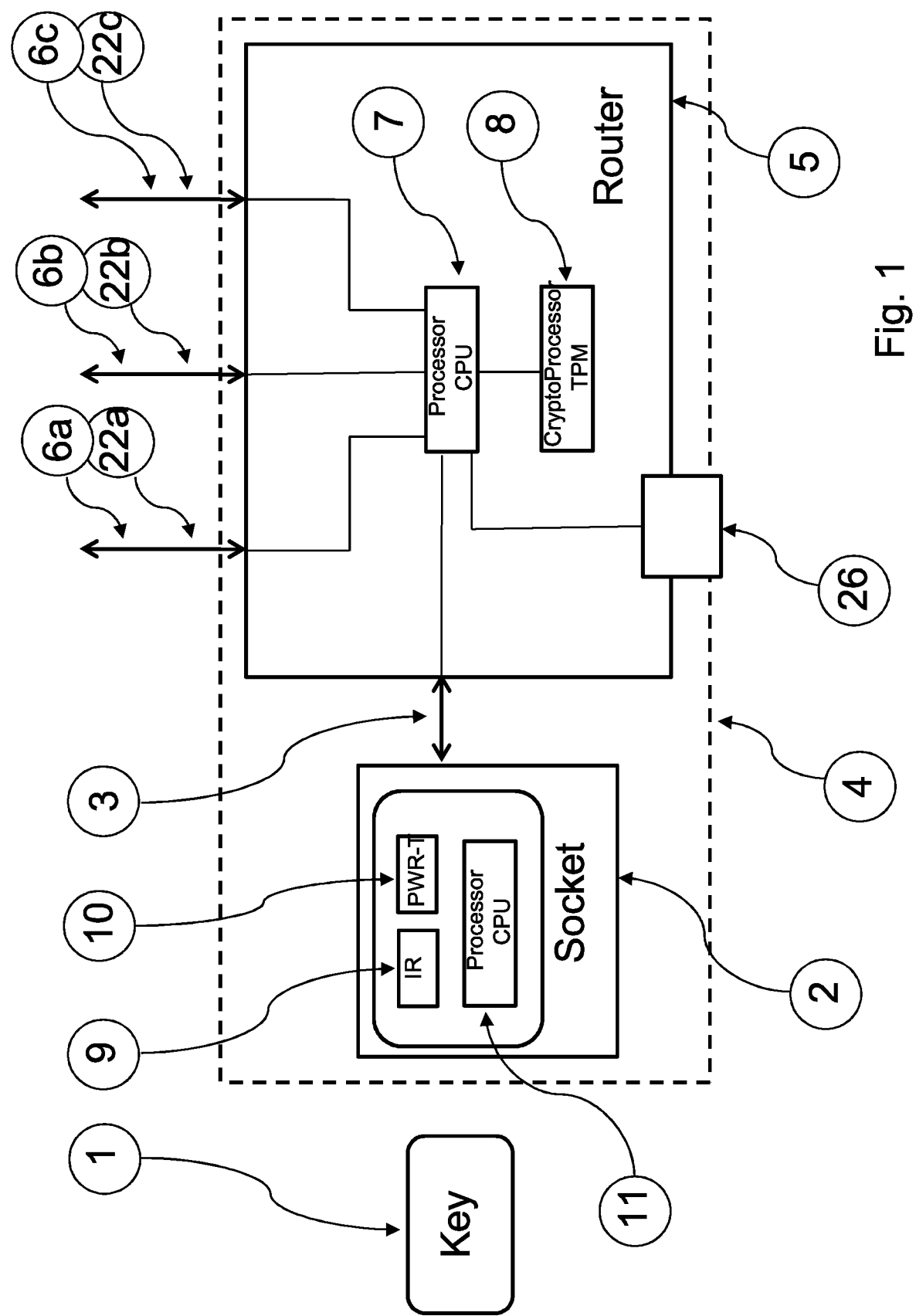
FIG. 1 illustrates connections of a router, a key and a key socket in an embodiment.
Figure 2:
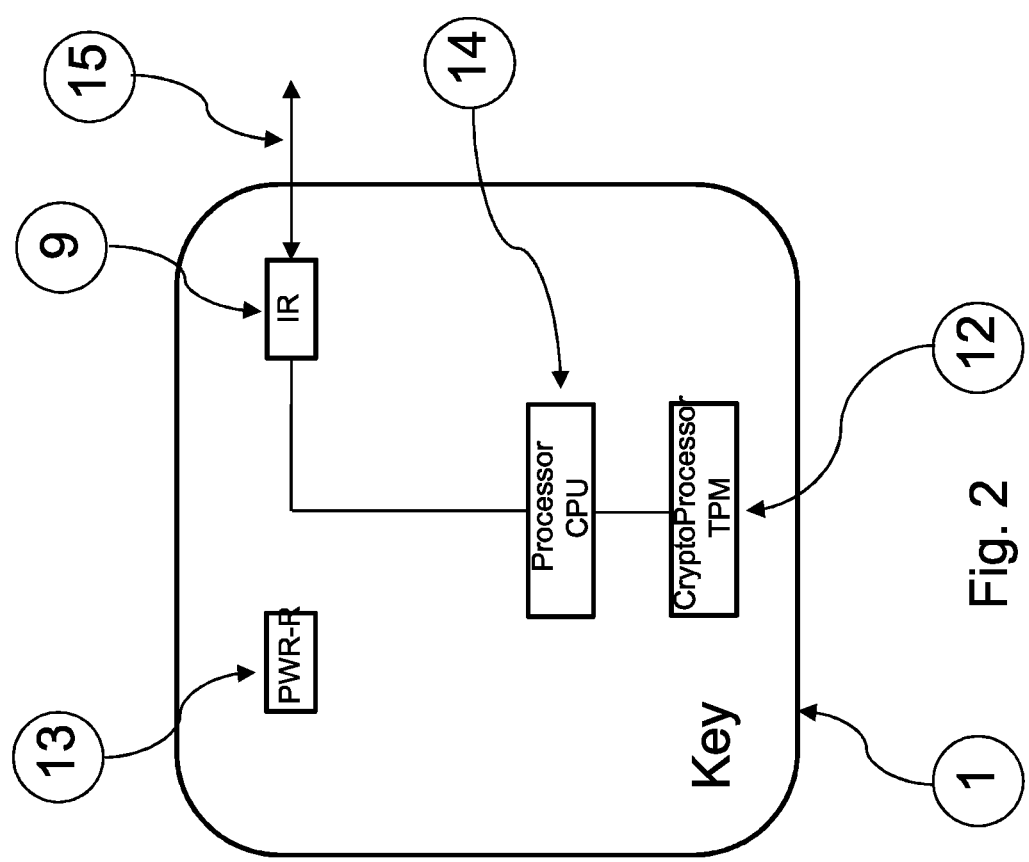
FIG. 2 illustrates elements of a key of an embodiment.
Figure 3:
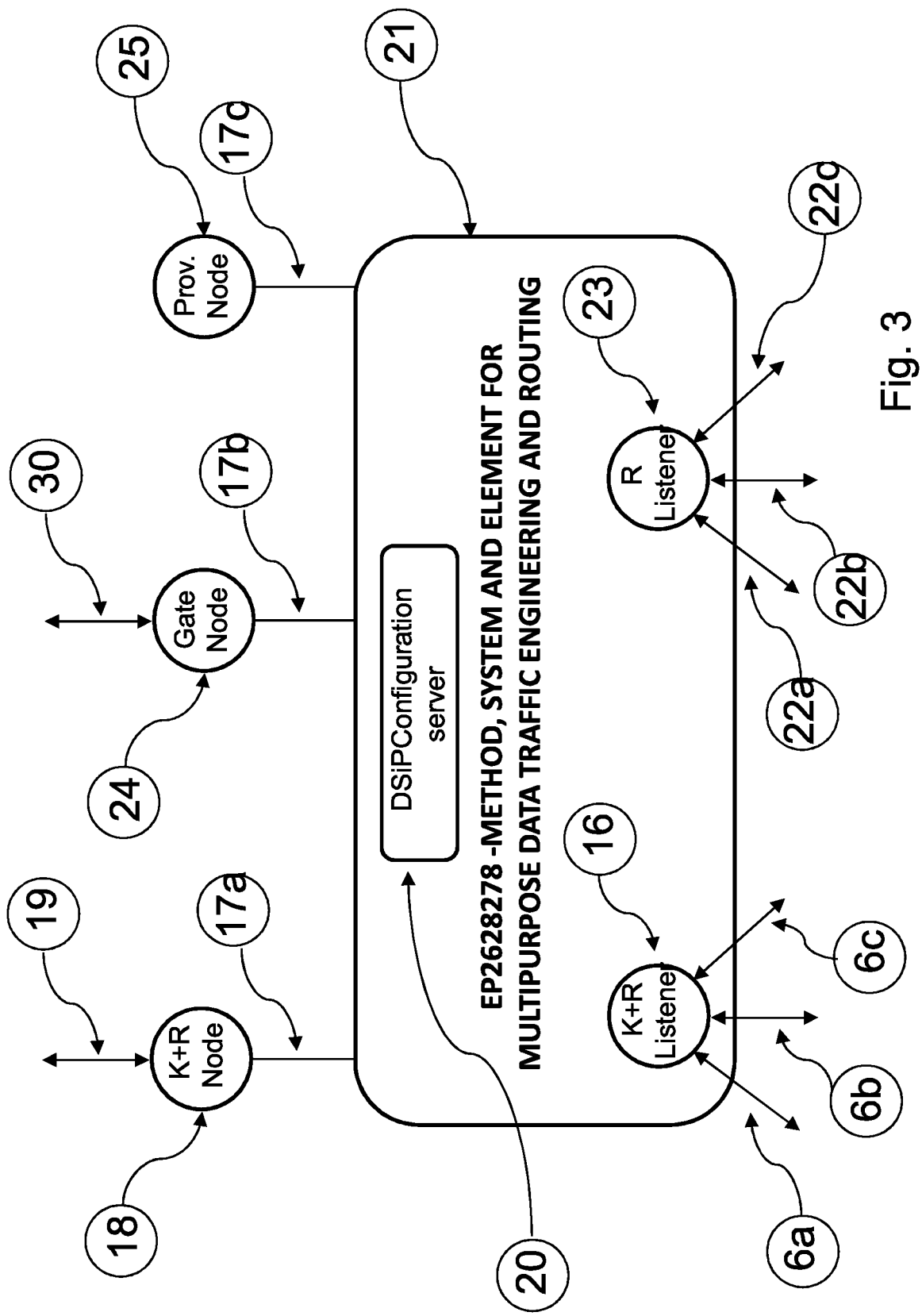
FIG. 3 illustrates interfaces in an embodiment of a DSiP routing system.
Figure 5:
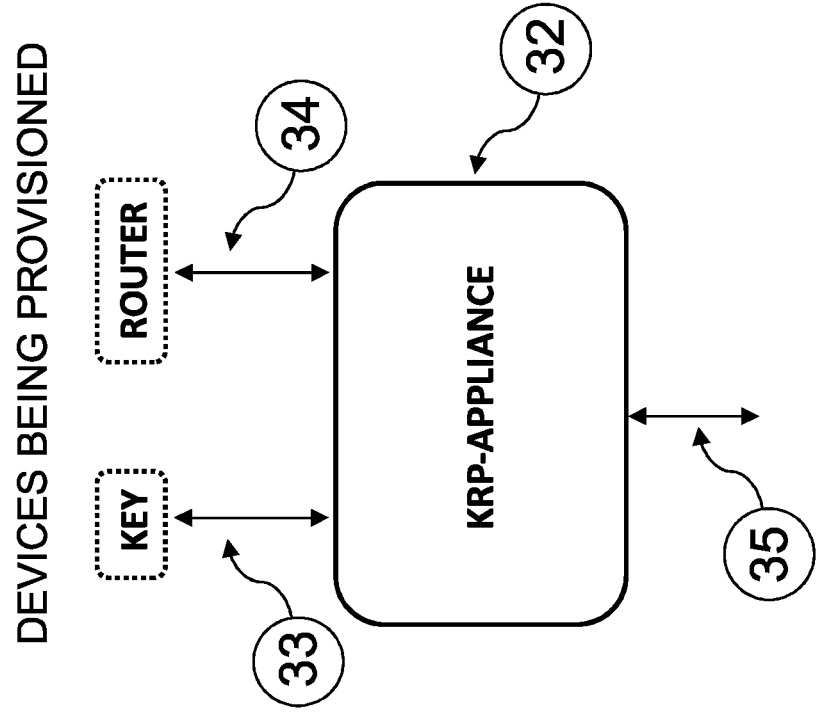
FIG. 5 illustrates an embodiment of a key-router provisioning appliance.
Figure 4:
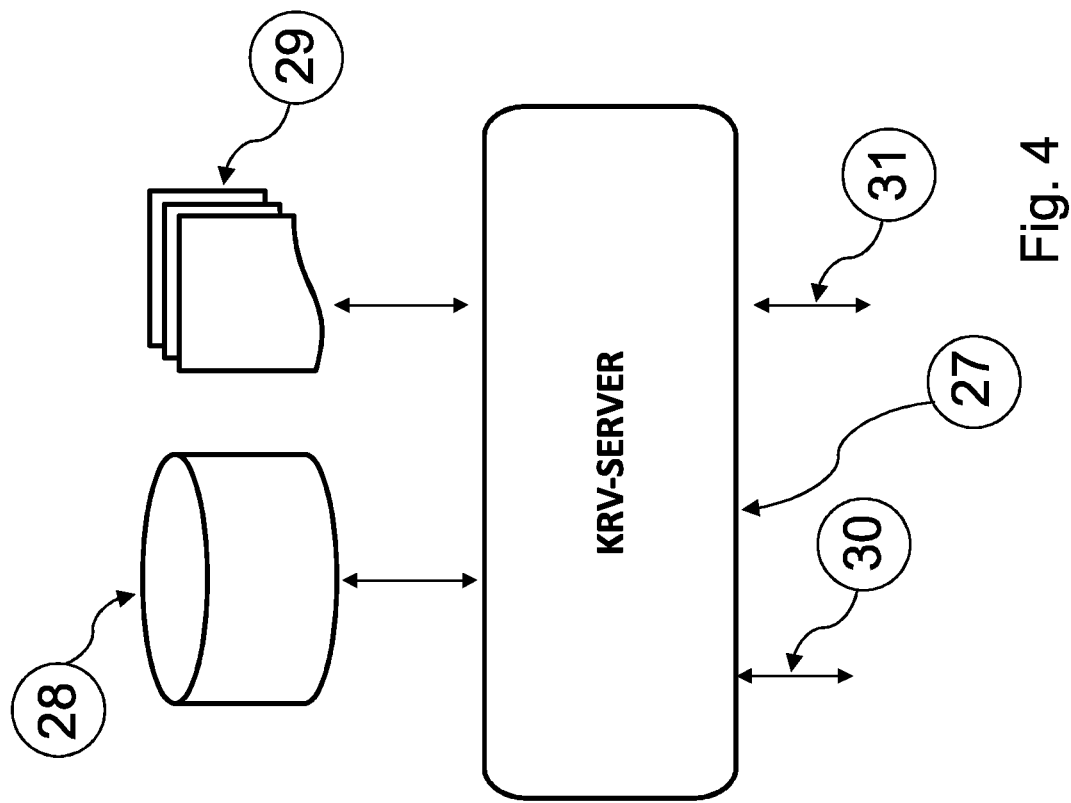
FIG. 4 illustrates connections of an embodiment of a key-router validation server.

The router (5) (or if the key socket (2) is integrated into the router, number (4)) connects to the back-end KRV-server (27) via, for example, a DSiP-routing system (21) using available means, for example but not limited to, one or multiple mobile data modems, satellite connections, fixed and wireless networks etc. The connections are depicted in FIG. 1 as numbered 6a to 6c and 22a to 22c. The router first uses connections 6a to 6c in order to validate itself and the associated (key in use) key (1) with the KRV-server (27). If the validation is correct, the router will consequently use connections 22a to 22c for further communication. The router contains a secure cryptoprocessor (8) such as, for example but not limited to, a Trusted Platform Module (TPM). Overall handling of various other mechanisms, such as communication are handled by a processor (7).

The DSiP (Distributed Systems intercommunication Protocol) traffic engineering and routing solution (21) is described in detail in the patent EP2628278. The solution is a flexible multi-channel routing system for providing uninterrupted and secure communication between elements utilising DSiP as routing.

The key- and router validation server (27), KRV-server, receives the ID-numbers for the key (1) and router (5) from the router (5) when the router has successfully connected itself to the Key-Router listening port (16). The KRV-server validates the ID-numbers by checking them against a KRV-database (28). If the KRV-database contains information that a particular key (1) may be used with a particular router (5), the KRV-server sends a challenge to the router (5). The challenge is processed by the router (5) and propagated to the key for further processing and retrieving response from the key (1). The combined key/router response is then sent back (as a reply to the challenge) to the KRV-server. If the combined response from the key and the router is correct, the KRV-server will retrieve a corresponding configuration information packet from a DSiP-configuration server (20) and send this to the router (5) upon which the router will disconnect from the KRV-server and reconnect with the DSiP-routing system for allowing traffic between the internal (36) and external (37) networks.

The key (1) and router (5) must be provisioned (initialized) in order to be used with the KRV-server (27) described in the present disclosure. This is done with a key-router provisioning appliance (32), KRP-appliance. Provisioning means storing unique ID-numbers to the key (1) and router (5) and generating public and private PKI (Public Key Infrastructure) password-crypto-keys to be used with the router and key. The private (PKI) password-crypto-keys are stored in the respective key (1) and router (5) cryptoprocessors (8; 12). The public password-crypto-keys are stored in the KRV-server KRV-database (28). In addition to the password-crypto-keys, the KRP-appliance (32) will also generate a public and private signature-key pair used by the router (5) and KRV-server (27) for peer verification regarding the DSiP-configuration. This will ensure that the router (5) will ultimately and eventually receive a correct set of instructions for connecting to the DSiP-routing listener (23) when the time has come. The KRP-appliance (32) can for example but not limited to be a computer program executed in a laptop-type of computer. In addition to the aforementioned, certain details, such as for example, pre-shared keys (PSK) and IP addresses and related ports to the Key/router-listener (16) are stored in the router and key cryptoprocessors (8; 12). The KRV-server generates unique ID-numbers for each device, key (1) and router (5) used in the system, at the KRP-appliance requests upon need.

Provisioning

The process of provisioning refers to setting up the system and components in order to use the router (5) and key (1). The information that must be generated, set up and provided is:

a) A Public-Private password-crypto-key pair (PKI) is generated for the key (1) and the router (5) the crypto-keys are generated as a co-operation between the KRV-server (27) and the KRP-appliance (32). The KRV-server generates password-crypto-keys at the KRP-appliance requests upon need. The Private password-crypto-key, common with all routers (5) in a system, is permanently stored in the key (1) cryptoprocessor (12) and will never leave from it. The Private password-crypto-key, common with all the keys (1) in a system, is permanently stored in the router (5) cryptoprocessor (8) and will never leave from it. In addition to the password-crypto-keys, a public/private signature-key pair is also generated during provisioning and the public signature-key is stored in the router (5) cryptoprocessor (8) password protected non-volatile memory and the private signature-key is stored in the KRV-database (28) for further use.

b) Another, unique public-private challenge-crypto-key (PKI) pair is generated for each key (1) and router (5). The router (5) stores its private challenge-crypto-key in its cryptoprocessor (8) and this key will never leave the cryptoprocessor. The key (1) stores its private challenge-crypto-key in its cryptoprocessor (12) and this key will never leave the cryptoprocessor. The KRV-server generates the challenge-crypto-keys at the KRP-appliance requests upon need. The public parts of the challenge-crypto-keys are stored in the KRV-server (27) KRV-database (28).

c) A unique cryptoprocessor (8) password is generated for each router (5). This password is encrypted by the KRP-appliance (32) using the routers (5) Public password-crypto-key and stored in the router (5) non-volatile memory.

d) A unique cryptoprocessor (12) password is generated for each key (1). This password is encrypted by the KRP-appliance (32) using the key (1) Public password-crypto-key and stored in the key (1) non-volatile memory.

e) An IP address and port to the Key Router listener process (16) is stored in the router (5) cryptoprocessor (8). There might be one or multiple IP-addresses and port settings stored in the router's cryptoprocessor (8). The IP-addresses and ports will be stored in a password protected non-volatile memory inside the router cryptoprocessor (8). The encrypted unique password, created in paragraph c), to this memory location is also stored in the router (5). Only the key (1) cryptoprocessor (12) containing the router's private crypto-key, has capabilities of decrypting this password.

f) A PSK-key (pre shared key as used in TLS) with associated ID-number is stored in a password protected non-volatile memory residing in the cryptoprocessor (12) of the key (1). There can be one or multiple PSK keys stored in the key cryptoprocessor non-volatile memory. Since there can be multiple PSK-keys associated with multiple IP-addresses, each IP-address can have its own PSK-key. The encrypted unique password, created in paragraph d), to this memory location is stored in the key (1). Only the router (5) cryptoprocessor (8) containing the key's private crypto-key, has capabilities of decrypting this password.

g) The IP addresses, ports, PSK-keys and IDs stored in the router (5) and key (1) are later used for creating an encrypted connection from the router to the Key Router listening process (16). This connection can be for example, but not limited to, according to connection principles of the TLS 1.3 method. (TLS Transport Layer Security as described in RFC 8446).

Provisioning the Key (1)

h) A key (1) is connected to the Key-Router Provisioning appliance (32) using a connection (33) and a key-socket (2) which is similar as used by the router (5) e.g., can be a serial line as in RS232/485 or it can be USB-based. The provisioning appliance (32) is basically a computer program designed to help the user set up the key (1), router (5) and the rest of the components needed.

i) The KRP-appliance (32) generates a HMAC-key and stores it in the key (1) cryptoprocessor (12).

j) The key (1) contains a unique ID-number stored in the key (1) cryptoprocessor (12). During provisioning, the ID-number is written to the key (1) and also stored in the KRV-server database (28).

k) A (PKI) private password-crypto-key is stored in the cryptoprocessor (12). This private crypto-key will never leave the crypto processor (12). The public part of the PKI password-crypto-key is stored in the KRV-server database (28). The cryptoprocessor (12) uses the private password-crypto-key to decrypt data such as passwords. An encrypted password might be entered into the cryptoprocessor (12) which decrypts it using the private password-crypto-key and returns the decrypted password.

Provisioning the Router (5)

l) A router (5) is connected to the Key-Router Provisioning appliance (32) using a connection (34) which can be a physical serial line as in RS232/485 or Ethernet-based, or similar. The provisioning appliance (32) is basically a computer program designed to help the user set up the key (1), router (5) and the rest of the components needed.

m) The router (5) contains a unique ID-number stored in the router (5) cryptoprocessor (8). During provisioning, the ID-number is written to the router (5) and also stored in the KRV-database (28).

n) A (PKI) private password-crypto-key is stored in the cryptoprocessor (8). This private password-crypto-key will never leave the crypto processor (8). The public part of the PKI password-crypto-key is stored in the KRV-server database (28). The cryptoprocessor (8) uses the private password-crypto-key to decrypt data such as passwords. An encrypted password might be entered into the cryptoprocessor (8) which decrypts it using the private password-crypto-key and returns the decrypted password.

Secrets Stored in the Key (1)

The key (1) will store the following secrets in its cryptoprocessor (12):

One or more password protected pre-shared keys (PSK) with associated ID's to be used in TLS-authentication.

A unique password protected ID-number for identifying a specific key (1)

A (PKI) private password-crypto-key to be used for decrypting passwords. This crypto-key is different from the router's (5) respective password-crypto-key. This crypto-key will never leave the cryptoprocessor (12).

A HMAC-key generated by the KRP-appliance (32). The HMAC-key will never leave the cryptoprocessor (12). The HMAC-key is unique for each key (1) in the system.

A (PKI) private unique challenge-crypto-key to be used for encrypting and decrypting data during the challenge process. This challenge-crypto-key is different from the router's (5) respective challenge-crypto-key. This crypto-key will never leave the cryptoprocessor (12).

Secrets Stored in the Router (5)

The router (1) will store the following secrets in its cryptoprocessor (8):

One or more password protected IP-addresses and ports to appropriate Key Router listening processes (16).

A unique password protected ID-number for identifying a specific router (5)

A (PKI) private password-crypto-key to be used for decrypting of passwords. This password-crypto-key is different from the key's (1) respective key. This password-crypto-key will never leave the cryptoprocessor (8).

A (PKI) private unique challenge-crypto-key to be used for encrypting and decrypting data during the challenge process. This challenge-crypto-key is different from the key's (1) respective challenge-crypto-key. The challenge-crypto-key will never leave the cryptoprocessor (8).

A (PKI) public unique signature-key for decrypting signed configuration hash.

Key-Event

A key-event is generated when a key (1) is inserted into a key socket (2) connected to a router (5). The router will detect the key insertion and start processing events.

System Function

When a key (1) is mounted onto a router (5) key socket (2), a key-event will occur and the router will begin processing the key-insertion. The router (5) starts a router-key-password-process in which the router will eventually receive a password to its own internal cryptoprocessor (8) from the key (1). The router (5) sends its own crypted password to the key (1) which will decrypt the password using its cryptoprocessor (12) and the private password-crypto-key stored in it. The decrypted password is sent back to the router (5). All communication between the key (1) and the router (5) occurs via the communications interface (3) and the link is encrypted with for example, but not limited to AES256 with Diffie-Hellman key exchange. The connection (3) with its encryption is always set up and negotiated before any data is sent from the router (5) to the key (1) and vice versa. When the router (5) has received the password from the key (1) it may open its internal cryptoprocessor (8) for retrieving information. The information retrieved is; IP addresses and ports for accessing the key router listening port (16) and its unique ID-number.

The key (1) will send its encrypted password to the router (5) which will decrypt it using its cryptoprocessor (8) and the private password-crypto-key stored in it. The decrypted password is sent back to the key (1). When the key (1) receives the password to its internal cryptoprocessor (12), it will read password protected information from its internal the cryptoprocessor (12). The information retrieved is: pre-shared keys and ID's (PSK) associated to connecting the router using TLS to the key router listening (16) process and its unique ID-number. The key (1) sends the PSK-keys and ID's and its identification ID-number to the router (5).

At this point the router may attempt to establish a TLS connection with the key router listener (16). The router initiates a TLS session by accessing the appropriate IP-address and port to the listener (16). The router provides the ID referring to a PSK-key to the listener (16) and the TLS session will begin using pre-shared keys as encryption parameters. When a successful TLS connection has been created, the authentication of both the key and router may begin. This is handled in the Challenge and Response section—validation of the key (1) and router (5).

Challenge and Response—Validation of the Key (1) and Router (5)

In order to successfully complete the Challenge-Response process, certain steps must have been completed before the process is started. The steps are:

- The KRP-appliance has stored (PKI) private challenge-crypto-keys into the cryptoprocessors (8)(12) of the router (5) and key (1) respectively. The private challenge-crypto-keys are unique for the key (1) and router (5) and they will never leave the cryptoprocessors. The KRP-appliance has stored the public parts of the key (1) and router (5) PKI challenge-crypto-key pairs in the system database (28). The private challenge-crypto-keys will never leave the cryptoprocessors (8) (12). The challenge-crypto-keys used by the router (5) and key (1) are unique for each key (1) and router (5)
- The KRP-appliance (32) has generated a HMAC-key. This HMAC-key has been stored in the cryptoprocessor (12) of the key (1) and it will never leave the cryptoprocessor (12). This HMAC-key is also stored in the system database (28). The HMAC-key is unique for each key (1).
- Each key (1) and router (5) in the system has been assigned a unique ID-number (UUID) which are stored in the respective devices cryptoprocessors (8) and (12) and the system database (28).
- An administrator of the system has selected and assigned a certain key (1) to be used with a certain router (5) based upon the devices ID-numbers. The assignments are stored in the database (28). Multiple keys (1) can be assigned and used with a single router (5) and a single key (1) can be assigned to be used with multiple routers (5).

When the router (5) has sent its own ID-number and the key (1) ID-number via the TLS encrypted connection to the key router listener (16), the listener forwards these ID-numbers to the back-end system KRV-server (27). The KRV-server checks if an administrator has assigned the key (1) to be used with this particular router (5) from the database (28). If the ID-numbers indicate a match, and a connection exists, the challenge process will start.

The Challenge-Response Process

Prerequisite: The router (5) must have successfully created a TLS connection for communicating with the back-end KRV-server (27). At least one key (1) has been assigned and configured to be used with the router (5) and all the other required steps of provisioning have been completed. This process describes how the challenge-response is handled by a unique key (1) used together with a unique router (5).

1. The KRV-server (27) generates a block of random data. The block can be for example but not limited to, a kilobyte of random data. This block of data is unique for each challenge process in the system. The data is generated every time when a key (1) and router (5) is challenged.
2. The KRV-server uses HMAC-key generated by the KRP-appliance and stored into the key (1) cryptoprocessor (12) for calculating a HMAC sum (hash) from the random data in step 1.
3. The KRV-server encrypts the random data from step 1, using the public part of the key (1) challenge-crypto-key stored in the database (28)
4. The KRV-server encrypts the encrypted data generated in step 3 using the router (5) public challenge-crypto-key stored in the database (28)
5. The KRV-server sends the doubly encrypted block of data to the router (5) via the key router listener (16)
6. The router decrypts the block of data it received from the KRV-server using its cryptoprocessor (8) and the private challenge-crypto-key stored in it. The cryptoprocessor (8) returns the decrypted data.
7. The decrypted block of data is then sent from the router (5) to the key (1) via the connection (3).
8. The key (1) decrypts the block of data using its cryptoprocessor (12) and the private challenge-crypto-key stored in it. The cryptoprocessor (12) returns the decrypted data. This doubly decrypted data represents now the same data as generated in step 1.
9. The key (1) uses the HMAC-key earlier provisioned to it, for calculating a HMAC sum over the random data block generated in step 1. The cryptoprocessor (12) uses the HMAC-key and calculates a HMAC-sum over the decrypted random block of data and returns a HMAC sum.
10. The HMAC sum is encrypted using the key (1) cryptoprocessor (12) private challenge-crypto-key (12) and the encrypted result is sent to the router (5) using the connection (3).
11. The router (5) encrypts the received data using its own cryptoprocessor (8) and the private challenge-crypto-key. The result is sent back to the KRV-server as a response to the challenge
12. The KRV-server decrypts the received response using the router (5) public challenge-crypto-key which was generated during provisioning.
13. The KRV-server decrypts the result from step 12 using the key (1) public challenge-crypto-key generated during provisioning.
14. The doubly decrypted result is now the HMAC sum calculated by the key (1)
15. The KRV-server compares the result from step 14 with the result from step 2. If the result from step 2 and 14 is equal, the key (1) and router (5) pair are considered valid upon which further steps may be taken.

Further Functionality after the Challenge Process

After a successful termination of the challenge process the KRV-server (27) will contact the DSiP-Configuration server (20) to ask for valid configuration data that the router should use when attempting to contact the DSiP-router listener (23).

The configuration data that the KRV-server receives from the DSiP-Configuration server contains one or multiple IP-addresses and associated ports to one or multiple DSiP-router listener (27) processes. In addition to this, the configuration data contains DSiP-passwords and PKI-certificates in order to create a peer-verified connection listener (27). The configuration data may also contain directives for using certain preferred connections (22*a*, and/or 22*b* and/or 22*c* etc.) over other—all this according the specifications of the DSiP-system as described in EP2628278.

Before sending the configuration data to the router (5) using the encrypted verified link via the Key Router listener (16), the KRV-server (27) will calculate a hash value over the configuration data block. The hash can be, for example but not limited to SHA384 or SHA512 or equivalent. The hash value resulted from the calculation will be signed by KRV-server (27) using the private part of the signature-key as created in the provisioning phase.

The signed hash-value is sent by the KRV-server (27) to the router (5) via the Key Router listener (16) together with the configuration data block.

The router (5) will calculate its own hash-value on the received configuration data and also decrypt the received signed hash-value using its public signature-key. If the routers (5) hash value matches the received decrypted hash-value, the configuration data is considered valid and can be accepted for making contacts to the systems Router listener (23). The hash-calculation methods are set and agreed upon creating the overall system. This means that the hash-method used in the KRV-server (27) must also be used in the router (5). For example, but not limited to, the KRV-server may use SHA384 or SHA512 and the router (5) must use the same methods respectively.

The router (5) will store the received configuration data only in volatile memory which means that the data will evaporate when the router (5) is disconnected from its power.

Upon successfully receiving the configuration data, the router (5) will disconnect from the Key Router listener (16) and establish new contacts to the Router listener (23) as directed by the received configuration data. The router (5) may occasionally check the presence of its assigned key (1) to maintain the connection/connections to the Router listener (23). If the key (1) is not detected, the router (5) may disconnect from the Router listener (23) and erase all configuration data upon all authentication and validation must resume from beginning.

If the key (1) is detected, the router will create and maintain a VPN connection between the external (37) and internal (36) networks as set by the configuration data. The key will not store the decrypted password anywhere and erases memory buffers upon completion of this phase.

In short: The key password is opened by the router and vice versa. Neither the key nor the router can decrypt their own passwords using their respective cryptoprocessors.

When the key (1) and router (5) have received their decrypted passwords, they may use them to access their respective NV-RAM memories.

Additional security: The cryptoprocessors may be parametrized to shut-down for a pre-determined time if for example the password to the NV-RAM is entered wrongly for example 3 times. The shut-down interval may be configured and set from minutes, hours to days. This protects the cryptoprocessor from brute-force attacks.

The NV-RAM of the key (1) contains Pre-Shared-Keys and related ID's to be used in contacting the Key-Router-Validation server using, for example, but not limited to TLS 1.3.

The NV-RAM of the router (5) contains IP-addresses and ports to the Key-Router-Validation server. The PSK-keys and IDs are received from the key (1) and thus the router may validate, for example, but not limited to a TLS1.3 connection to the back-end system.

The password-crypto-, challenge-crypto-, and the signature-keys used in the system are all strongly encrypted with for example but not limited to RSA2048. These keys are stored in the devices (key and router) respective cryptoprocessors and will never leave from them.

In a preferred embodiment of the present disclosure, a communication system comprises:
a router comprising a cryptographic processor having a first private challenge-crypto-key, a first private password-crypto-key, and a password-protected non-volatile memory stored therein;
a key comprising a cryptographic processor having a second private challenge-crypto-key, a second private password-crypto-key, and a password-protected non-volatile memory stored therein;
a key socket connected to said router, said key socket being configured to receive said key and to communicate with the received key;

said router being configured to receive an encrypted key-password from said key, to decrypt said key-password using the first private password-crypto-key, and to return the decrypted key-password to said key, said key being configured to receive an encrypted router-password from said router, to decrypt said router-password using the second private password-crypto-key, and to return the decrypted router-password to said router, said key being further configured to read a first authentication data from the password-protected non-volatile memory of the key using the decrypted key-password, and to send the first authentication data to the router, said router being further configured to read a second authentication data from the password-protected non-volatile memory of the router using the decrypted router-password and to authenticate the router to a key/router validation server using the first authentication data and the second authentication data. The communication system further comprises:
the key/router validation server configured to keep a database of validated key-router pairs and to send a challenge with a two-layer encryption to the router as a response to identifiers of a validated key-router pair received from the router;
said router being further configured to decrypt a first layer of said challenge with the first private challenge-crypto-key and to send the partially decrypted challenge to said key,
said key being configured to decrypt a second layer of said challenge with the second private challenge-crypto-key and return a first challenge response based on the decrypted challenge to said router,
wherein said router is further configured to send a second challenge response based on said first challenge response to the key/router validation server, and where the key/router validation server is configured to send configuration data to the router for connecting to an internal network after receiving a valid second challenge response from said router.

In an embodiment, said first authentication data comprises a pre-shared key and a pre-shared key ID.

In an embodiment, the second authentication data comprises an IP address and a related port number of the key/router validation server.

The key has a HMAC-key stored within the cryptographic processor and said key is configured to calculate a hash-based message authentication code checksum (HMAC-sum) with said HMAC-key of the decrypted challenge.

The first challenge response is the hash-based message authentication code checksum (HMAC-sum) encrypted with the second private challenge-crypto-key. The second challenge response is the encrypted HMAC-sum encrypted again with the first private challenge-crypto-key.

In an embodiment, both the key and the key socket comprise an infrared data transceiver, the key and the key socket being configured to transfer data between them using said infrared data transceivers.

It is obvious to the skilled person in the art that, as technology develops, the basic idea of the invention can be implemented in various ways. The invention and its embodiments are therefore not limited to only the examples presented above, rather they may vary within the scope of the claims.

Abbreviations and Definitions

AES-256-CBC—Advanced Encryption Standard with Cipher Block Chaining
Cryptoprocessor—A processor specialized for cryptographic purposes Diffie-Hellman—method of exchanging cryptographic keys over a public channel DSiP—Distributed Systems intercommunication Protocol. A traffic engineering solution for encrypted multichannel communication.

DSiP Configuration—Data-block of access credentials to the DSiP-routing system.

HMAC—Hash-based Message Authentication Code

HMAC-key—A cryptographic key used for calculating a HMAC-sum

HMAC-sum—A calculation result resulted from using HMAC-key

ID-number—A sequence of bytes for uniquely identifying a key and/or router

KRV—Key Router Validation server

KRP—Key Router Provisioning appliance

PKI—Public Key Infrastructure with Public and Private crypto-keys

Private password-crypto-key—A private cryptographic key for encrypting and/or decrypting password data Private signature-key—A private cryptographic key for signing a block of data Public password-crypto-key—A public cryptographic key for encrypting and/or decrypting password data Public signature-key—A private cryptographic key for verifying signature of data PSK—Pre-Shared-Key as in for example but not limited to, TLS 1.3 RFC 8446

Qi—Inductive Charging, as specified by the Wireless Power Consortium

RSA2048—Public-key cryptosystem with semiprimes consisting of 2048 bits

SHA384/SHA512—Secure Hash Algorithm with digest 384 or 512 bits respectively

TLS—Transport Layer Security, for example but not limited to TLS 1.3 RFC 8446

TPM—Trusted Platform Module, as specified by the Trusted Computing Group

USB—Universal Serial Bus (industry standard)

VPN—Virtual Private Network

LIST OF ELEMENTS IN FIGS. 1 TO 6

1. Key
2. Key socket
3. Connection (for example, but not limited to serial communication e.g., RS485) between key socket (2) and router (5)
4. The key socket (2) may be integrated into the communications router (5)
5. Communications router
6. (a, b, c) One or multiple for example IP-data, but not limited to, connections between router (5) and the back-end interface (16)
7. Communications router (5) main processor and associated memory and logic circuitry
8. Cryptoprocessor residing in the router (5) for example, but not limited to, a Trusted Platform Module TPM
9. IR transmitter and receiver (transceiver) for example, but not limited to, an IrDA-device
10. System for wirelessly transmitting energy to the key (1) for example, but not limited to, a Qi-transmitter
11. Socket controlling processor
12. Cryptoprocessor residing in the key (1) for example but not limited to, a Trusted Platform Module TPM
13. System for wirelessly receiving energy from the key socket (2) for example, but not limited to, a Qi-receiver
14. Controlling processor for the key (1)
15. Bidirectional optical communication link between key (1) and key socket (2) for example, but not limited to, an IrDA link
16. Listener port for key (1) and routers (5) to the back-end system, integral part of the DSiP-routing (21) system
17. (a to c) Node connections to the DSiP data traffic engineering solution as described in EP2628278
18. Internal interface to the Back-end system, named (Key Router) KR-Node
19. Connection to the key (1) and router (5) validation server (27)
20. DSiP Configuration Server
21. DSiP-routing traffic engineering and routing system as described in patent EP2628278
22. (a,b,c) One or multiple for example IP-data, but not limited to, connections between router (5) and the DSiP-routing (21) system
23. Listener port for the DSiP routing system (21), integral part of the DSiP-routing (21) system
24. iP-Gate node to internal networks
25. Node for connecting a provisioning user interface to the system, resides in the KRP-appliance (32)
26. On one or multiple interface(s) to router (5) for external equipment/networks (37) e.g., but not limited to, ethernet, WLAN etc.
27. Key (1) and router (5) validation server, named KRV-server
28. Key (1) Router (5) validation database, named KRV-database
29. Non-repudiable KRV-server log files
30. Connection from the ipGate-node (24) to internal networks (36)
31. Connection to the DSiP-system (21) Configuration Server (20)
32. Key (1) and router (5) provisioning appliance, KRP-appliance
33. Connection to key (1) being provisioned
34. Connection to router (5) being provisioned
35. Connection from the KRP-appliance (32) to the DSiP-system (21)
36. Internal networks
37. External networks

The invention claimed is:

1. A communication system comprising:
a router comprising a cryptographic processor having a first private challenge-crypto-key, a first private password-crypto-key, and a password-protected non-volatile memory stored therein;
a key comprising a cryptographic processor having a second private challenge-crypto-key, a second private password-crypto-key, a HMAC-key, and a password-protected non-volatile memory stored therein;
a key socket connected to said router, said key socket being configured to receive said key and to communicate with the received key;
a key-router validation server having a database;
said router being configured to receive an encrypted key-password from said key, to decrypt said key-password using the first private password-crypto-key, and to return the decrypted key-password to said key;
said key being configured to receive an encrypted router-password from said router, to decrypt said router-password using the second private password-crypto-key, and to return the decrypted router-password to said router;

said key being further configured to read a first authentication data from the password-protected non-volatile memory of the key using the decrypted key-password, and to send the first authentication data to the router;

said router being further configured to read a second authentication data from the password-protected non-volatile memory of the router using the decrypted router-password and to authenticate the router to the key-router validation server using the first authentication data and the second authentication data;

said router further configured to send a validated key-router pair comprising a unique router ID-number and a unique key ID-number to the key router validation server, wherein the key-router validation server maintains the validated key-router pair in the database;

said key-router validation server configured to send a challenge with a two-layer encryption to the router in response to validating that said key is assigned to said router based on matching the unique router ID-number and the unique key ID-number received from the router;

said router being further configured to decrypt a first layer of said challenge with the first private challenge-crypto-key and to send the partially decrypted challenge to said key;

said key being configured to decrypt a second layer of said challenge with the second private challenge-crypto-key, calculate a hash-based message authentication code checksum (HMAC-sum) with said HMAC-key of the decrypted challenge and return a first challenge response to said router, wherein said first challenge response is the hash-based message authentication code checksum (HMAC-sum) encrypted with the second private challenge-crypto-key;

said router is further configured to send a second challenge response based on said first challenge response to the key-router validation server, wherein the second challenge response is the encrypted HMAC-sum encrypted again with the first private challenge-crypto-key;

the key-router validation server is configured to send configuration data to the router for connecting to an internal network after receiving a valid second challenge response from said router.

2. The communication system according to claim 1, wherein said first authentication data comprises a pre-shared key and a pre-shared key ID.

3. The communication system according to claim 1, wherein the second authentication data comprises an IP address and a related port number of the key-router validation server.

4. The communication system according to claim 2, wherein the second authentication data comprises an IP address and a related port number of the key-router validation server.

5. The communication system according to claim 1, wherein both the key and the key socket comprise an infrared data transceiver, the key and the key socket being configured to transfer data between the key and the key socket using said infrared data transceivers.

6. The communication system according to claim 2, wherein both the key and the key socket comprise an infrared data transceiver, the key and the key socket being configured to transfer data between the key and the key socket using said infrared data transceivers.

7. The communication system according to claim 3, wherein both the key and the key socket comprise an infrared data transceiver, the key and the key socket being configured to transfer data between the key and the key socket using said infrared data transceivers.

\* \* \* \* \*